(12) United States Patent
Matthews

(10) Patent No.: US 6,633,670 B1
(45) Date of Patent: Oct. 14, 2003

(54) MASK GENERATION FOR MULTI-LAYER IMAGE DECOMPOSITION

(75) Inventor: Kristine Elizabeth Matthews, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/541,142

(22) Filed: Mar. 31, 2000

(51) Int. Cl.[7] ................................................. G06K 9/34
(52) U.S. Cl. ........................ 382/176; 382/173; 382/199; 382/164; 382/225; 382/240; 382/283; 358/462; 358/464
(58) Field of Search ................................. 382/164, 166, 382/171, 173, 176, 199, 225, 232, 233, 238, 239, 240, 251, 260, 274, 284, 282, 283; 348/384.1; 358/426.04, 462, 464; 375/240, 240.02, 240.11

(56) References Cited

U.S. PATENT DOCUMENTS

| | | | |
|---|---|---|---|
| 5,341,226 A | 8/1994 | Shiau | 358/518 |
| 5,432,870 A | 7/1995 | Schwartz | 382/232 |
| 5,539,842 A | 7/1996 | Schwartz | 382/232 |
| 5,745,596 A | 4/1998 | Jefferson | 382/176 |
| 5,778,092 A | 7/1998 | MacLeod | 382/176 |
| 5,802,203 A | 9/1998 | Black et al. | 382/173 |
| 5,956,468 A | 9/1999 | Ancin | 358/1.9 |
| 6,360,022 B1 * | 3/2002 | Lubin et al. | 382/260 |
| 6,373,981 B1 * | 4/2002 | de Queiroz et al. | 382/176 |

OTHER PUBLICATIONS

Huang, et al "Segmentation–based hybrid coding using luminance masking", IEEE, pp. 750–751, 1998.*
Aiyer et al., "A Fast, Table–Lookup Algorithm for Classifying Document Images" IEEE/ICIP Kobe Japan Proceedings, Oct. 1999.
Mukherjee et al., "Document Page Segmentation Using Multiscale Clustering" IEEE/ICIP Kobe Japan Proceedings, Oct. 1999.
Said et al., "Simplified Segmentation for Compound Image Compression" IEEE/ICIP Kobe Japan Proceedings, Oct. 1999.
Li et al., "Text and Picture Segmentation by the Distribution Analysis of Wavelet Coefficients" IEEE/ICIP Chicago, IL Proceedings, Oct. 1999.
Li et al., "Context Based Multiscale Classification of Images" IEEE/ICIP Chicago, IL Proceedings, Oct. 1999.
Lu, "Detection of Text Regions from Digital Engineering Drawings" IEEE Transactions on Pattern Analysis and Machine Intelligence, vol. 20, No. 4, Apr. 1998.

(List continued on next page.)

*Primary Examiner*—Daniel G. Mariam
(74) *Attorney, Agent, or Firm*—Chernoff, Vilhauer, McClung & Stenzel, LLP

(57) ABSTRACT

To improve compression efficiency and decompressed image quality, images are decomposed into separate layers each containing a limited number of image element types (text, line art, or photographic). Each layer can then be compressed separately with a process that is optimal for the type of image element included in the layer. Images are decomposed into foreground, background, and mask layers. The value of a pixel in the mask layer designates whether the spatially corresponding pixel of the recomposed image will be selected from the spatially corresponding pixels of either the foreground or the background layer. The present invention provides a method of determining the value of a pixel for a mask layer. The image is partitioned into large and small sub-images or blocks. A sub-image mask is created for each sub-image by sorting pixels of the sub-image into clusters centered on the luminance of pixels of a pair of pixels of maximum luminance gradient. The value of a pixel in the mask layer is determined by a relationship of the sub-image mask values of the pixels larger and smaller sub-images of which the pixel being evaluated is a member.

26 Claims, 3 Drawing Sheets

OTHER PUBLICATIONS

Etemad et al., "Multiscale Segmentation of Unstructured Document Pages Using Soft Decision Integration," IEEE Transactions on Pattern Analysis and Machine Intelligenc, vol. 19, No. 1, Jan. 1997.

Savakis, Adaptive Document Image Thresholding Using Foreground and Background Clustering, IEEE/ICIP Chicago, IL Proceedings, Oct. 1999.

Simon et al., "A Fast Algorithm for Bottom–Up Document Layout Analysis" IEEE Transactions on Pattern Analysis and Machine Intelligenc, vol. 19, No. 3, Mar. 1997.

Draft ITU–T Recommendation T.44 "Mixed Raster Content (MRC)", International Telecommunication Union, Study Group 8 (Contribution (10/97).

Bottou et al., "High Quality Document Image Compression with DjVu" Jul. 13, 1998.

Haffner et al., Color Documents on the Web with DjVu IEEE/ICIP Kobe Japan Proceedings, Oct. 1999.

Huttenlocher et al., "Digipaper: A Versatile Color Document Image Representation" IEEE/ICIP Kobe Japan Proceedings, Oct. 1999.

Queiroz, "Compression of Compound Documents" IEEE/ICIP Kobe Japan Proceedings, Oct. 1999.

Tompkins et al., A Fast Segmentation Algorithm for Bi–Level Image Compression using JBIG2 IEEE/ICIP Kobe Japan Proceedings, Oct. 1999.

* cited by examiner

MASK GENERATION FOR MULTI-LAYER IMAGE DECOMPOSITION

BACKGROUND OF THE INVENTION

The present invention relates to layered decomposition of images arid, more particularly, to the creation of a mask for layers of the digitally decomposed image.

The large size of digital data files required to represent images makes data compression an imperative when storing or transmitting images. On the other hand, compression can be problematic because many images comprise a combination of text, line-art graphics elements, and photographic elements and compression processes are commonly designed to be more effective with one type of image element than another. For example, the JPEG (Joint Photographic Experts Group) standard (ISO 10918) is designed to effectively compress the complex multi-color matrix of photographic elements. Annoying artifacts can appear in decompressed images, especially in the vicinity of sharp transitions which are common characteristics of graphical and textual elements. On the other hand, the compression process of the JBIG (Joint Bilevel Image Group) standard (ISO/IEC 11544:1993) utilizes arithmetic encoding and is particularly effective in compressing text and graphics but less effective in compressing natural photographic elements.

One method for improving the efficiency and results of image compression decomposes compound images into layers containing a type or types of elements that are effectively compressed using a single process. The data of each layer is then compressed with a process that is particularly effective with the type of data contained in the layer. The DRAFT ITU-T RECOMMENDATION T.44 "MIXED RASTER CONTENT (MRC)," International Telecommunication Union (ITU), Telecommunication Standardization Sector, October 1997, incorporated herein by reference, specifies the technical features of an imaging format based on segmentation of images or pages into multiple layers (planes) according to the type of image element and the application of encoding, spatial and color resolution processing specific to the type of image element comprising the layer. The ITU recommendation models a page or image as three layers; a background layer containing contone color(continuous tone and palletized color) element; a foreground layer containing text and line-art graphics, and a bi-level mask layer interposed between the background and foreground layers. The mask is used to select the layer (background or foreground) from which a pixel will be rendered in the recomposed image. The pixels of the mask layer act as a bi-level switch to select a spatially corresponding, pixel in the layer immediately above or below the mask layer. For example, if an exemplary mask layer pixel has a value of "1," a spatially corresponding pixel might be selected from the background layer for rendering in the final image. However, if the mask layer pixel has. a value of "0" the corresponding pixel would be selected from the foreground layer. While the ITU recommendation provides for processing, interchange, and archiving images in multiple layers, it does not provide a method of generating a mask layer to facilitate layered decomposition of an image.

L. Bottou et al. describe a mask generation method in HIGH QUALITY DOCUMENT COMPRESSION WITH "DiVu", JOURNAL OF ELECTRONIC IMAGING, Vol. 7, pp 410–425, 1998. An image is partitioned into square blocks of pixels of different sizes. Two dominant colors are identified for the pixels of each block. Cluster initialization is inherited from the previous, lower resolution (larger) block size. The pixels of each block are sorted into clusters according to the. closeness of their individual colors to one of the dominant colors of the block. An iterative, k-means algorithm is-used to sort the pixels for clustering. The iterative nature of the process increases the computational resources and the processing time required for mask creation.

D. Huttenlocher et al. describe a decomposition process in DIGIPAPER: A VERSATILE COLOR DOCUMENT IMAGE REPRESENTATION, Proceedings of the IEEE, International Conference on Image Processing, Kobe, Japan, October 24–25, 1999. The process utilizes token compression where a binary image is represented using a dictionary of token shapes and position information indicating where the token is to be drawn in the image. Segmentation of the image relies on attributes of text including the token representation of text as objects. As a result, the method is more effective with text than graphics.

What is desired, therefore, is method of layered image decomposition that is resource and time conservative and equally effective when decomposing a page or image into its text, graphical, and photographic elements.

SUMMARY OF THE INVENTION

The present invention overcomes the aforementioned drawbacks of the prior art by providing a method of generating a mask for a layered image decomposition comprising the steps of partitioning the image as a plurality of first sub-images and as a plurality of second sub-images dimensionally differing from the first sub-images, both the first and the second sub-images comprising pluralities of pixels; assigning a first sub-image mask value to an evaluation pixel according to a relationship of the luminance of the evaluation pixel and a sub-image luminance of the first sub-image; assigning a second sub-image mask value to the evaluation pixel according to a relationship of the luminance of the evaluation pixel and a sub-image luminance of the second sub-image; and setting a mask value for the evaluation pixel as a function of the first and second sub-image mask values for a plurality of pixels of the first and the second sub-images. The method is non-iterative and conserves computational resources and time which is important for on-line operations. Further, the method is equally effective for text, line art graphic, and photographic image elements.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1A:
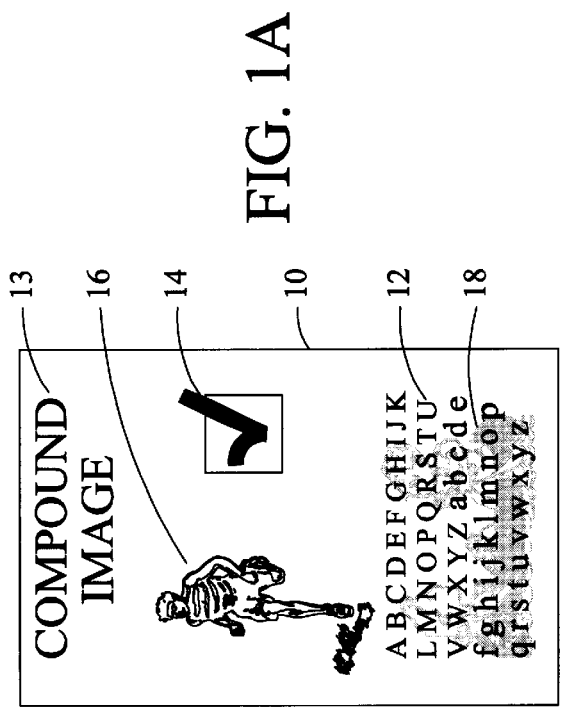
FIG. 1A illustrates an exemplary compound image including image elements of differing types.
Figure 1B:
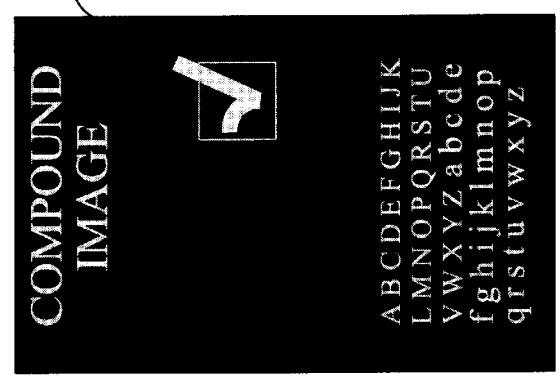
FIG. 1B illustrates a layered decomposition of the exemplary image of FIG. 1A into foreground, background, and mask layers.
Figure 1B:
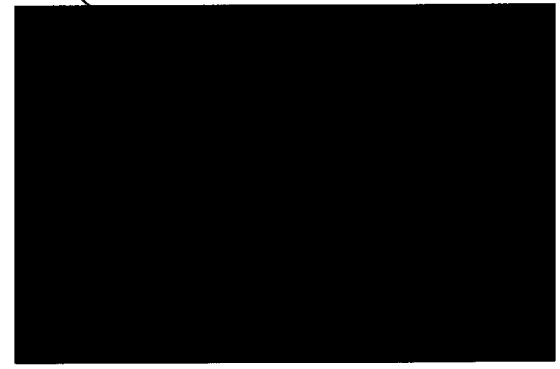

A compound page or image 10 comprising textual 12 and 13, line-art or graphic 14, and photographic 16 and 18 elements is illustrated in FIG. 1A. For purposes of data storage and transmission, it is desired to decompose the image 10 into layers, each layer containing one or more specific types of image element. For example, text 12 and graphics 14 might be included in a foreground layer 20 while photographic elements 16 and 18 are included in a background layer 22 as illustrated in FIG. 1B. When the image 10 is recomposed and rendered, each pixel of the recomposed image will be selected from one of the spatially corresponding pixels of either the foreground 20 or background 22 layer as determined by a bi-level switch in the form of the value taken by a spatially corresponding pixel of a mask layer 24 interposed between the foreground 20 and background 22 layers. For example, if a pixel at a particular spatial location in the mask 24 is represented as a digital "1" (white), the color of the spatially corresponding pixel in the final image would correspond to the color of the spatially corresponding pixel in the foreground layer 20. On the other hand, if the mask pixel is a "0" (black), the color of the pixel for the final image would be selected from the other layer, the background 22. The creation of a mask 24 is an essential part of a layered decomposition of an image.

Figure 2:
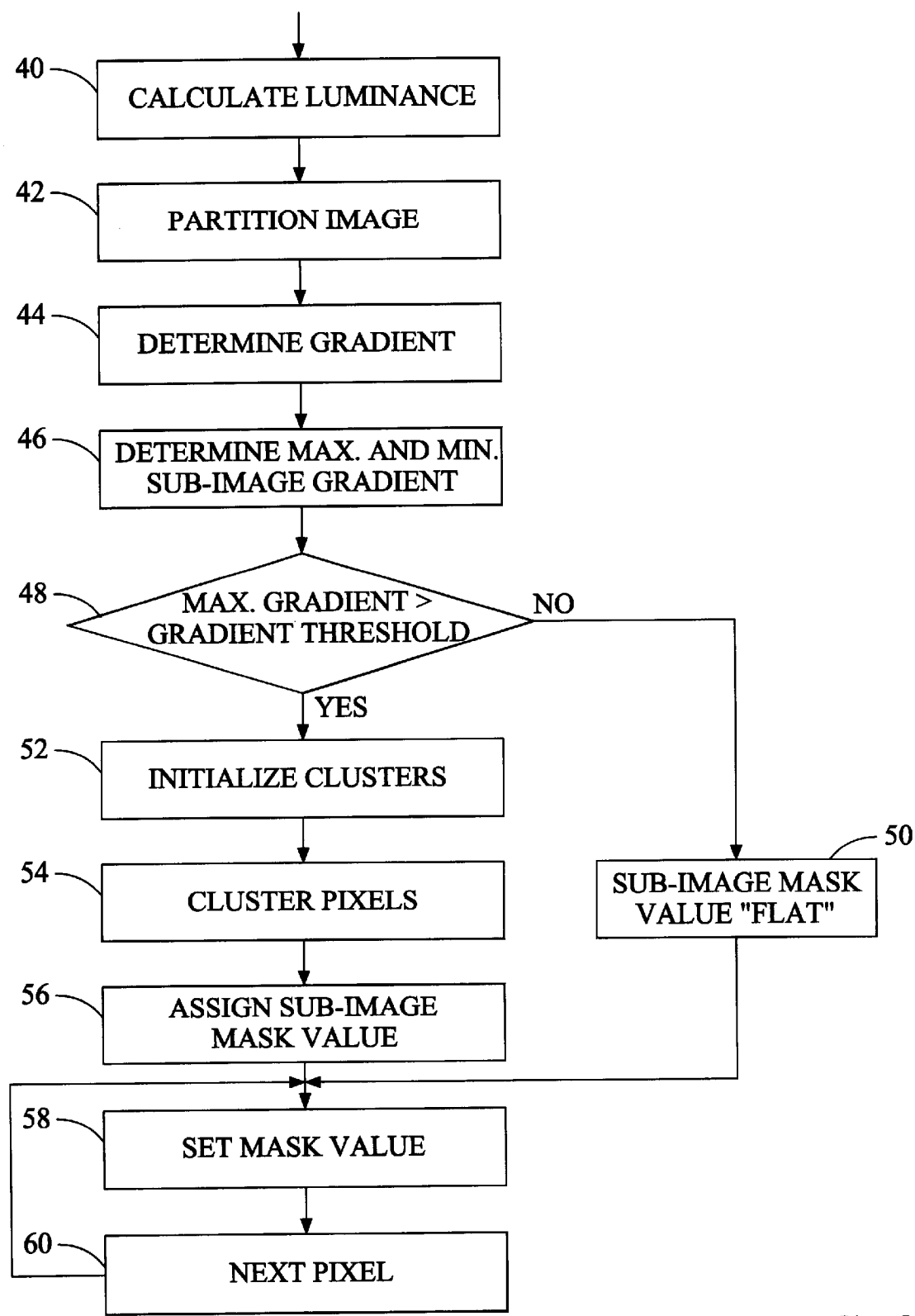
FIG. 2 is a block diagram of the mask generation method.

The mask creation steps of the present invention are illustrated in FIG. 2. Initially, a luminance representation of each of the pixels of the image is determined 40. The Y channel of the YUV color space, the Y' channel of the Y'CbCr color space, the Y component of the Commission Internationale de L'Éclairage (CIE) XYZ color space and the L-channel of the CIE L*a*b* color difference formula are suitable representations of the luminance for the present method. If the image is represented in a color space that does not provide a luminance channel then the luminance can be calculated. For example, luminance can determined for pixels in the RGB (red, green, blue) color space by application of a transform utilizing tristimulus values. While luminance is a convenient attribute of a pixel, other attributes may be used.

Figure 3:
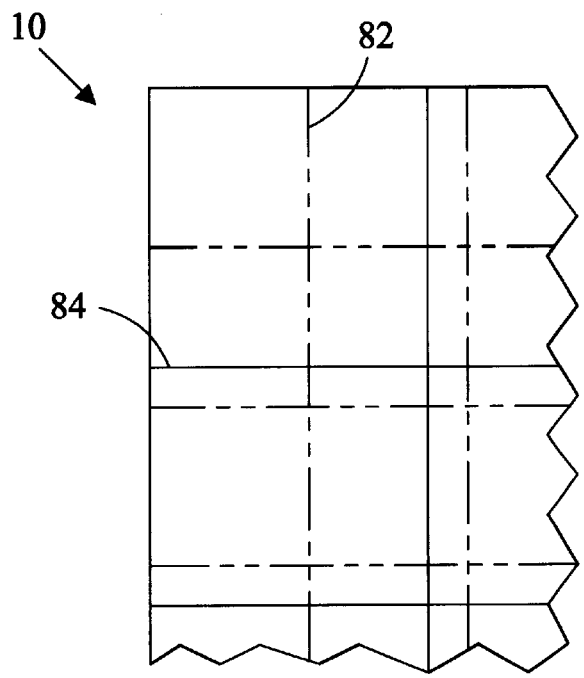
FIG. 3 illustrates partitioning of a portion of an image into mutually exclusive sub-images of two sizes.

In a second step, the image is spatially partitioned 42. Referring to FIG. 3, the image 10 is partitioned into two sets of mutually exclusive, sub-images of differing dimensions. Sub-images in the form of square blocks with a smaller block 82 ($B_s \times B_s$ in dimension) and a larger block 84 ($B_L \times B_L$ in dimension) are illustrated. The dimensions of the blocks ($B_s$ and $B_L$) are arbitrary. Each pixel is a member of a smaller and a larger sub-image. While square sub-images can be used, the image could be partitioned into sub-images having shapes other than square. A sub-image mask is produced for each of the sub-images of each size in the image 10.

Figure 4:
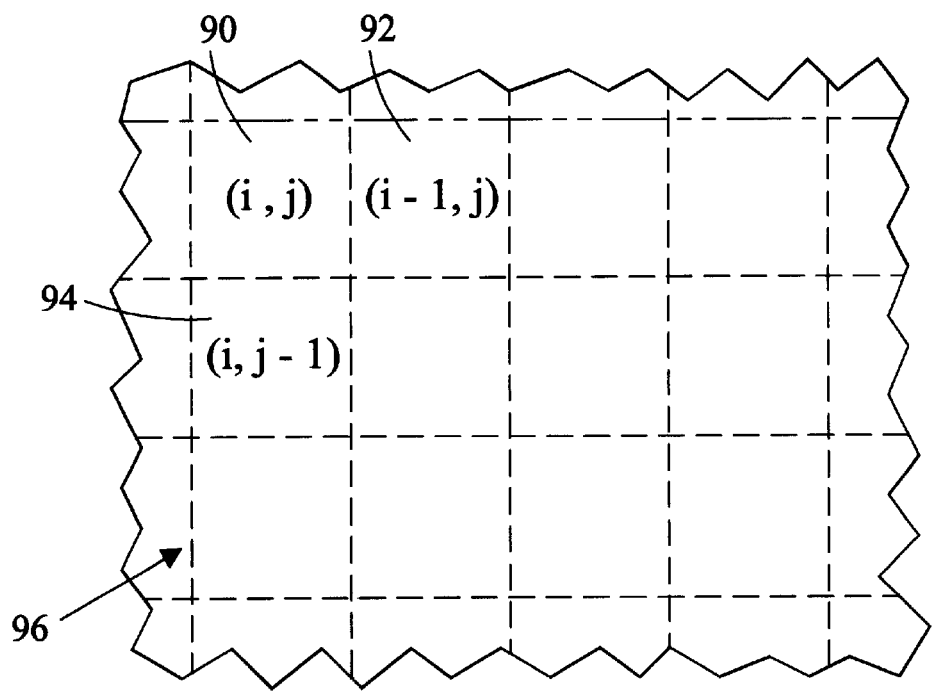
FIG. 4 illustrates pixels of an exemplary sub-image in a portion of an image.

To create a sub-image mask a gradient is determined 44 for each pixel of a sub-image. Referring to FIG. 4, the gradient expresses the relative luminance of a pixel and its neighboring pixels. For example, the gradient can be a two dimensional expression of the difference between the luminance of a pixel 90 and its contiguous horizontal 92 and vertical 94 neighbors:

$$\Delta = (\Delta_V, \Delta_h)$$

$$\Delta_V = |l(i,j) - l(i,j-1)|$$

$$\Delta_h = |l(i,j) - l(i-1,j)|$$

where: $\Delta_V$=the vertical gradient of pixel (i,j)

$\Delta_h$=the horizontal gradient of pixel (i,j)

l(i,j)=the luminance of pixel (i,j)

l(i−1,j)=the luminance a horizontally neighboring pixel l(i,j−1)=the luminance a vertically neighboring pixel From the set of data representing the gradients of the pixels of a sub-image, a maximum horizontal and vertical gradient is established for the sub-image 46. The maximum sub-image gradient can be expressed as:

$$\Delta_{max} = max(\Delta_V, \Delta_h)$$

where:

$$\Delta_V = max_{i=1,B-1 \atop j=0,B-1} |l(i,j) - l(i-1,j)|$$

$$\Delta_h = max_{i=1,B-1 \atop j=0,B-1} |l(i,j) - l(i,j-1)|$$

where: B=the block size ($B_s$ or $B_L$), as appropriate

The maximum sub-image gradient for a sub-image is compared to a gradient threshold 48 for that size of sub-image. If the maximum gradient is less than the threshold, the sub-image is declared to be flat 50. While the gradient threshold may based on a luminance difference, it could be based on other or additional features. For example, the gradient threshold might be based on the luminous separation of the pixels of a pair of pixels exhibiting the maximum gradient; the compactness of luminance values of pixels in a cluster or a relationship between clusters of pixels of spatially neighboring sub-images.

If the maximum gradient of a sub-image is greater than the applicable gradient threshold, two clusters of pixels are initialized 52 for the sub-image. One cluster is centered on the value of the luminance of a first pixel of the pixel pair of maximum gradient for the sub-image and the other on the value of the luminance of the second pixel of the maximum gradient pair. The luminance of each pixel of the image is evaluated relative to the luminance of each of the pixels of the maximum gradient pair for each of the sub-images of which it is a member. Each evaluation pixel is assigned to a cluster of pixels whose center is luminously nearest to the evaluation pixel 54. The Euclidean distance may be used to express the distance between the luminance values of pixels.

The clusters of pixels are assigned to either a foreground or background layer of a sub-image mask 56 produced for each sub-image. For example, a cluster of pixels with a lesser luminance may be assigned to the foreground layer and a cluster with a greater luminance assigned to the background layer. The sub-image layer value of each pixel of a cluster is the layer value (foreground or background) assigned to the cluster of which it is a member.

The final mask is generated by assigning a value to each pixel of the mask layer indicating the appropriate layer (foreground or background) from which the pixel is to be taken in rendering the final image. The mask value is assigned on the basis of a function relating the values of pixels of the sub-image masks for the larger and smaller sub-images of which the pixel is a member 58. While other relationships might be utilized for specific types of documents or to improve results with a particular process, the relationships expressed in the following table have been utilized for generating a final mask.

| Large sub-image | And Small sub-image | Mask Value |
| --- | --- | --- |
| background | mixed | small sub-image |
| foreground | mixed | small sub-image |
| mixed | mixed | small sub-image |
| flat | mixed | small sub-image |
| background | all flat | large sub-image |

| Large sub-image | And Small sub-image | Mask Value |
| --- | --- | --- |
| foreground | all flat | large sub-image |
| mixed | all flat | large sub-image |
| flat | flat | background |

The columns headed "large sub-image" and "small sub-image" indicate the sub-image mask value of a substantial portion of the pixels of the corresponding larger or smaller sub-images of which the pixel of interest is a member. The column headed "mask value" indicates that the value of the pixel of interest in the final mask is either the sub-mask value of the pixel for the designated smaller sub-image or larger sub-image or if both the sub-image masks are "flat," the mask value is assigned the background layer value. For example, if a substantial portion of the pixels of the sub-image mask for the larger sub-image are background pixels and the pixels of the sub-image mask for the smaller sub-image are mixed foreground and background, then the final mask value of the pixel is the value of the pixel in the sub-image mask for the smaller sub-image. When the mask value of a pixel has been determined, the method selects the next pixel for evaluation 60. When the final mask value of a pixel has been selected, the spatially corresponding pixel of the designated layer is selected for inclusion in the recomposed image.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of generating a mask for a layered decomposition of an image, said method comprising the steps of:

(a) partitioning said image into a plurality of first sub-images and into a plurality of second sub-images dimensionally differing from said first sub-images, said first and said second sub-images comprising pluralities of pixels;

(b) assigning a first sub-image mask value to an evaluation pixel according to a relationship of a luminance of said evaluation pixel and a sub-image luminance of a first sub-image containing said evaluation pixel;

(c) assigning a second sub-image mask value to said evaluation pixel according to a relationship of said luminance of said evaluation pixel and a sub-image luminance of a second sub-image containing said evaluation pixel; and (d) setting a mask value for a pixel in said mask spatially corresponding to said evaluation pixel according to a relationship of said first and second sub-image mask values for a plurality of pixels of said first and said second sub-images containing said evaluation pixel.

2. The method of claim 1 wherein the step of assigning a sub-image mask value to an evaluation pixel according to a relationship of said luminance of said evaluation pixel and said sub-image luminance of at least one of said first and said second sub-images containing said evaluation pixel comprises the steps of:

(a) determining a gradient relating a pixel of a sub-image to a neighboring pixel;

(b) identifying a first sub-image luminance corresponding to a luminance of a first pixel of a pixel pair of maximum gradient;

(c) identifying a second sub-image luminance corresponding to a luminance of a second pixel of said pixel pair of maximum gradient;

(d) assigning said evaluation pixel to one of said first pixel and said second pixel of said pixel pair of maximum gradient as a function of a distance from said luminance of said evaluation pixel to said first sub-image luminance and a distance from said luminance of said evaluation pixel to said second sub-image luminance; and (e) assigning a sub-image mask value to a pixel assigned to one of said first pixel and said second pixel of said pair of pixels of maximum gradient according to a relationship of said first sub-image luminance and said second sub-image luminance.

3. The method of claim 2 wherein the step of determining a gradient relating a pixel to a neighboring pixel comprises the step of determining a difference between a luminance of said pixel and a luminance of said neighboring pixel.

4. The method of claim 2 wherein the step of determining a gradient relating a pixel to a neighboring pixel comprises the steps of:

(a) determining a difference between a luminance of said pixel and a luminance of a horizontally neighboring pixel; and (b) determining a difference between a luminance of said pixel and a luminance of a vertically neighboring pixel.

5. The method of claim 2 wherein the step of assigning a sub-image mask value to a pixel assigned to one of said first and said second pixels of said pair of pixels of maximum gradient according to a relationship of said first sub-image luminance and said second sub-image luminance comprises assigning a foreground sub-image mask value to pixels assigned to a pixel of said maximum gradient pair corresponding to a greater one of said first sub-image luminance and said second sub-image luminance.

6. The method of claim 1 further comprising the step of assigning a flat sub-image mask value to pixels of a sub-image if a sub-image luminance gradient does not exceed a luminance gradient threshold.

7. The method of claim 6 wherein the step of setting a mask value for said evaluation pixel as a function of said first and second sub-image mask values for a plurality of pixels of said first and said second sub-images comprises the steps of:

(a) setting said mask value for said evaluation pixel to a layer value if pixels of said first and said second sub-image masks are assigned a flat sub-image mask value; and (b) setting said mask value for said evaluation pixel to a sub-image mask value if pixels of at least one of said first and said second sub-image masks are assigned a sub-image mask value other than flat.

8. A method of generating a mask for a layered decomposition of an image, the method comprising the steps of:

(a) determining a gradient relating a pixel of said image to a neighboring pixel;

(b) spatially partitioning said image into a plurality of first sub-images each comprising a first plurality of pixels;

(c) assigning a first sub-image mask value to an evaluation pixel according to a relationship of a luminance of said evaluation pixel and a sub-image luminance of said first sub-image containing said evaluation pixel;

(d) spatially partitioning said image into a plurality of second sub-images each comprising a second plurality of pixels;

(e) assigning a second sub-image mask value to said evaluation pixel according to a relationship of said luminance of said evaluation pixel and a sub-image luminance of said second sub-image containing said evaluation pixel; and (f) setting a mask value for said evaluation pixel as a function of said first and second sub-image mask values for a plurality of pixels of said first and said second sub-images containing said evaluation pixel.

9. The method of claim 8 wherein the step of determining a gradient relating a pixel to a neighboring pixel comprises the step of determining a difference between a luminance of said pixel and a luminance of said neighboring pixel.

10. The method of claim 8 wherein the step of determining a gradient relating a pixel to a neighboring pixel comprises the steps of:

(a) determining a difference between a luminance of said pixel and a luminance of a horizontally neighboring pixel; and (b) determining a difference between a luminance of said pixel and a luminance of a vertically neighboring pixel.

11. The method of claim 8 wherein the step of assigning a sub-image mask value to said evaluation pixel according to a relationship of said luminance of said evaluation pixel and a sub-image luminance of one of said first and said second sub-images comprises the steps of;

(a) identifying a pixel pair of maximum gradient for said sub-image;

(b) associating said evaluation pixel to a luminously nearer one of a first pixel of said pixel pair of maximum gradient and a second pixel of said pixel pair of maximum gradient; and (c) assigning a sub-image mask value to said evaluation pixel as a function of a relative luminance of said pixels of said maximum gradient pair.

12. The method of claim 8 wherein the step of spatially partitioning said image as a plurality of sub-images comprises the step of dividing the image into a plurality of equally dimensioned, mutually exclusive square areas.

13. The method of claim 8 wherein the step of setting a mask value for said evaluation pixel as a function of said first and second sub-image mask values for a plurality of pixels of said first and said second sub-images comprises the steps of:

(a) setting said sub-image mask value for pixels of a sub-image as flat if a gradient of said sub-image does not exceed a gradient threshold;

(b) assigning a background layer value as a mask value of said evaluation pixel if said sub-image mask values for said first sub-image and second sub-image of which said evaluation pixel is a member are flat; and (c) assigning a sub-image mask value as the mask value of said evaluation pixel if at least one of said sub-image mask values for said first and said second sub-images is not flat.

14. The method of claim 13 wherein said gradient threshold is a function of a luminance.

15. The method of claim 13 wherein said gradient threshold is a function of a luminous separation between a cluster of pixels of a sub-image centered on a first pixel of maximum gradient pair and a cluster of pixels of said sub-image centered on a second pixel of said maximum gradient pair.

16. The method of claim 13 wherein said gradient threshold is a function of a luminous separation of pixels included in a cluster of pixels.

17. The method of claim 13 wherein said gradient threshold is a function of a relationship between luminance of pair of pixels of maximum gradient in at least two sub-images in spatial proximity.

18. A method of layered decomposition of an image, said method comprising the steps of:

(a) determining a luminance of a plurality of pixels of said image;

(b) calculating a gradient between said luminance of a pixel and said luminance of a horizontally adjacent pixel and a vertically adjacent pixel;

(c) partitioning said image into a first plurality of mutually exclusive first sub-images each comprising a first plurality of pixels and a second plurality of mutually exclusive second sub-images each comprising a second plurality of pixels;

(d) identifying a pair of pixels of maximum gradient for a sub-image, (e) associating an evaluation pixel with a luminously nearer one of a first pixel of a maximum gradient pair and a second pixel of a maximum gradient pair of pixels of a sub-image that contains said evaluation pixel and said maximum gradient pair of pixels;

(f) assigning a sub-image mask value to a pixel associated with a pixel of said maximum gradient pair of pixels according to a luminance relationship of said pixels of said maximum gradient pair;

(g) assigning a flat sub-image mask value to pixels of a sub-image if said maximum gradient is less than a gradient threshold;

(h) assigning a mask layer value to a pixel as a function of a sub-image mask value assigned to a plurality of pixels of said sub-image containing said pixel; and (i) selecting a spatially corresponding pixel for inclusion in an image from one of a background layer and foreground layer in response to said mask layer value of said pixel.

19. The method of claim 18 wherein said gradient threshold is a function of a luminance.

20. The method of claim 18 wherein said gradient threshold is a function of a separation between a cluster of pixels centered on said luminance of said first pixel of said maximum gradient pair and a cluster of pixels of centered on said luminance of said second pixel of said maximum gradient pair.

21. The method of claim 18 wherein said gradient threshold is a function of a luminous separation of pixels included in a cluster of pixels.

22. The method of claim 18 wherein said gradient threshold is a function of a relationship between luminance of pixel pairs of maximum gradient in at least two sub-images in spatial proximity.

23. The method of claim 18 wherein said first and said second sub-images are square in shape.

24. The method of claim 18 wherein the step of associating an evaluation pixel with a luminously nearer one of a first pixel of a maximum gradient pair and a second pixel of a maximum gradient pair of pixels of a sub-image that contains said evaluation pixel and said maximum gradient pair of pixels comprises the step of determining the lesser of the Euclidean distance between said luminance of said pixel and said luminance of said first pixel and said luminance of said second pixel of said maximum gradient pair.

25. The method of claim 18 wherein the step of assigning a mask layer value to a pixel as a function of a sub-image mask value assigned to a plurality of pixels of said sub-image comprises the steps of:
   (a) setting said mask value of said pixel to one of a background and a foreground layer value when said pixel is clustered in a first plurality of pixels and a second plurality of pixels assigned a flat sub-image mask value; and
   (b) setting said mask value of said pixel to a sub-image mask value assigned to said pixel when said pixel is clustered in at least one of a first plurality and a second plurality of a pixels assigned a sub-image mask value other than flat.

26. The method of claim 25 wherein the step of setting said mask value of said pixel to a sub-image mask value assigned to said pixel when said pixel is clustered in at least one of a first plurality and a second plurality of a pixels assigned a sub-image mask value other than flat comprises the steps of:
   (a) setting said mask value of said pixel to a first sub-image mask value of said pixel if said pixel is clustered in a second plurality of pixels having mixed foreground and background sub-mask values; and
   (b) setting said mask value of said pixel to a second sub-image mask value of said pixel if said pixel is clustered in a first plurality of pixels having a first sub-image mask value other than flat and said second plurality of pixels having a flat sub-mask value.

* * * * *

UNITED STATES PATENT AND TRADEMARK OFFICE
CERTIFICATE OF CORRECTION

PATENT NO. : 6,633,670 B1
DATED : October 14, 2003
INVENTOR(S) : Matthews

It is certified that error appears in the above-identified patent and that said Letters Patent is hereby corrected as shown below:

Column 4,
Line 20, change "may based" to -- may be based --

Signed and Sealed this

Eighth Day of March, 2005

JON W. DUDAS
*Director of the United States Patent and Trademark Office*